July 26, 1966  L. M. HALLS  3,262,253
MOUNTING STRUCTURE
Filed May 25, 1964  2 Sheets-Sheet 1
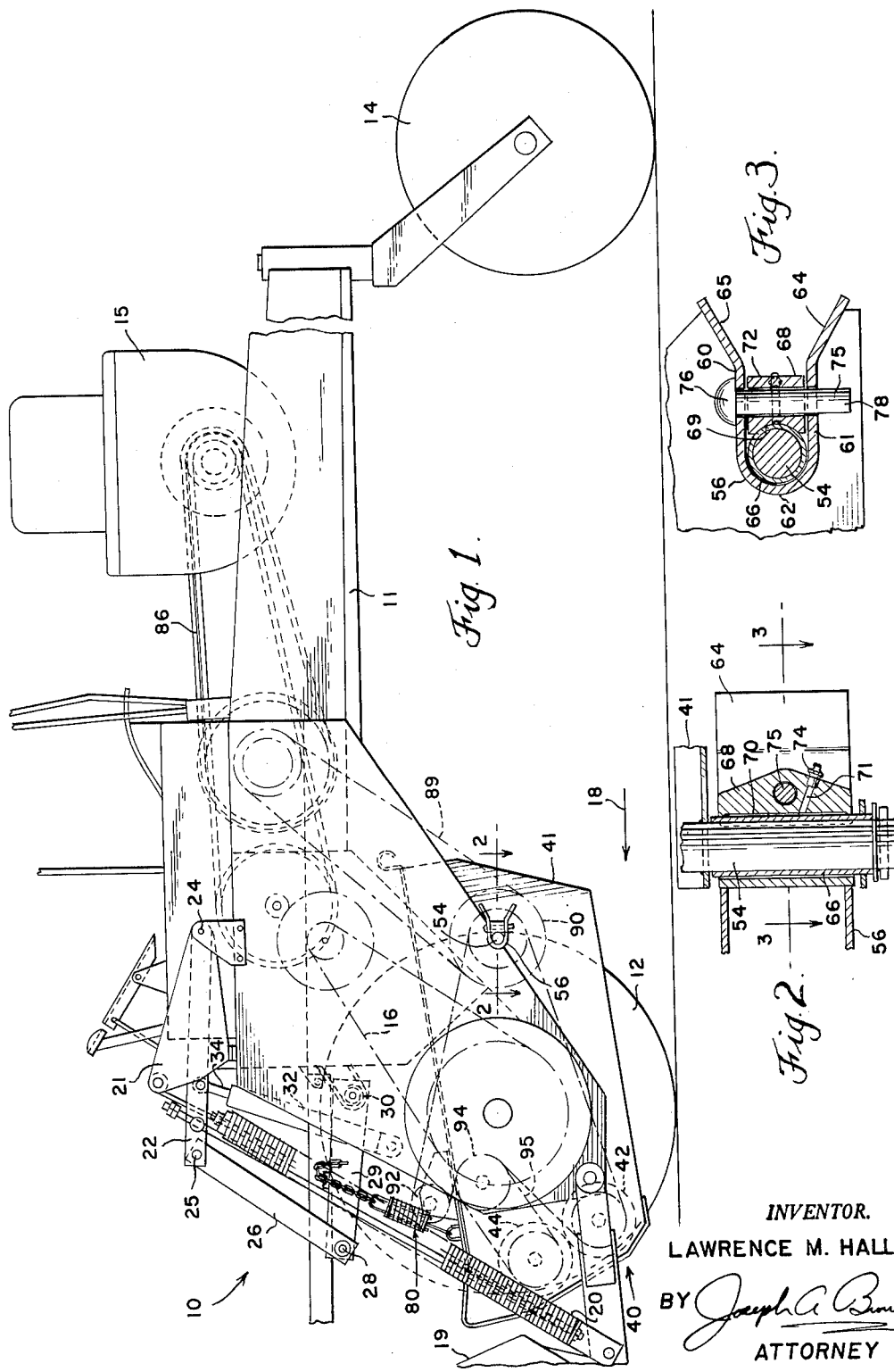
INVENTOR.
LAWRENCE M. HALLS
BY *Joseph A. Brown*
ATTORNEY INVENTOR
LAWRENCE M. HALLS
BY Joseph A. Brown
ATTORNEY

United States Patent Office 3,262,253
Patented July 26, 1966

3,262,253
MOUNTING STRUCTURE
Lawrence M. Halls, New Holland, Pa., assignor to Sperry Rand Corporation, New Holland, Pa., a corporation of Delaware
Filed May 25, 1964, Ser. No. 369,703
11 Claims. (Cl. 56—1)

This invention relates to agricultural machines, particularly implements adapted to cut standing crop material, consolidate it and deposit the material in a windrow. More specifically, the invention relates to an improved arrangement for mounting a crop conditioner on a windrower.

A windrower or swather has a frame supported on wheels for field travel. A header is carried at the front of the machine and extends transversely. Standing crop material is cut by a reciprocating sickle and the material is deposited on a crop consolidating conveyor, either in the form of a pair of spaced drapers or auger sections. The cut crop is delivered to a center location where it is discharged in a windrow.

Depending upon the crop being harvested and the wishes of the operator, it is often practiced to condition the crop material before it leaves the machine and is finally deposited on the ground. This is done by passing the material between a pair of cooperative crusher or crimper rolls as the material leaves the conveyor. The conditioning action of the material facilitates drying before the material is picked up to be baled or otherwise handled.

When the operator wishes to use the windrower without the conditioner, he disconnects it from the base machine. When conditioning is desired, the conditioner is attached to the implement. One main problem heretofore is to provide a mounting structure for a windrower conditioner whereby the conditioner can be easily attached and disconnected. It is not uncommon to have windrowers which require several hours of strenuous labor to attach or disconnect a conditioner.

One object of this invention is to provide an improved and simplified structure for detachably mounting a crop conditioner on a windrower frame.

Another object of this invention is to provide a mounting structure whereby a conditioner may be mounted on a windrower in a few minutes rather than several hours and without strenuous effort.

Another object of this invention is to provide a conditioner mounting structure which provides for a pivoting action of the conditioner when it is in place to establish optimum operating positions for the conditioner rolls.

A further object of this invention is to provide power means for pivoting a conditioner relative to a windrower frame, this same means being utilized in mounting and detaching the conditioner.

A further object of this invention is to provide conditioner mounting means which includes a drive train unaffected by the pivotal position of the conditioner relative to the windrower frame.

Other objects of this invention will be apparent hereinafter from the specification and from the recital in the appended claims.

In the drawings:

FIG. 1 is a fragmentary side elevation of a windrower having a conditioner mounted according to this invention in underslung relation to the windrower frame;

FIG. 2 is an enlarged section taken on the line 2—2 of FIG. 1 looking in the direction of the arrows;

FIG. 3 is a section taken on the line 3—3 of FIG. 2 looking in the direction of the arrows;

Figures 4, 5:
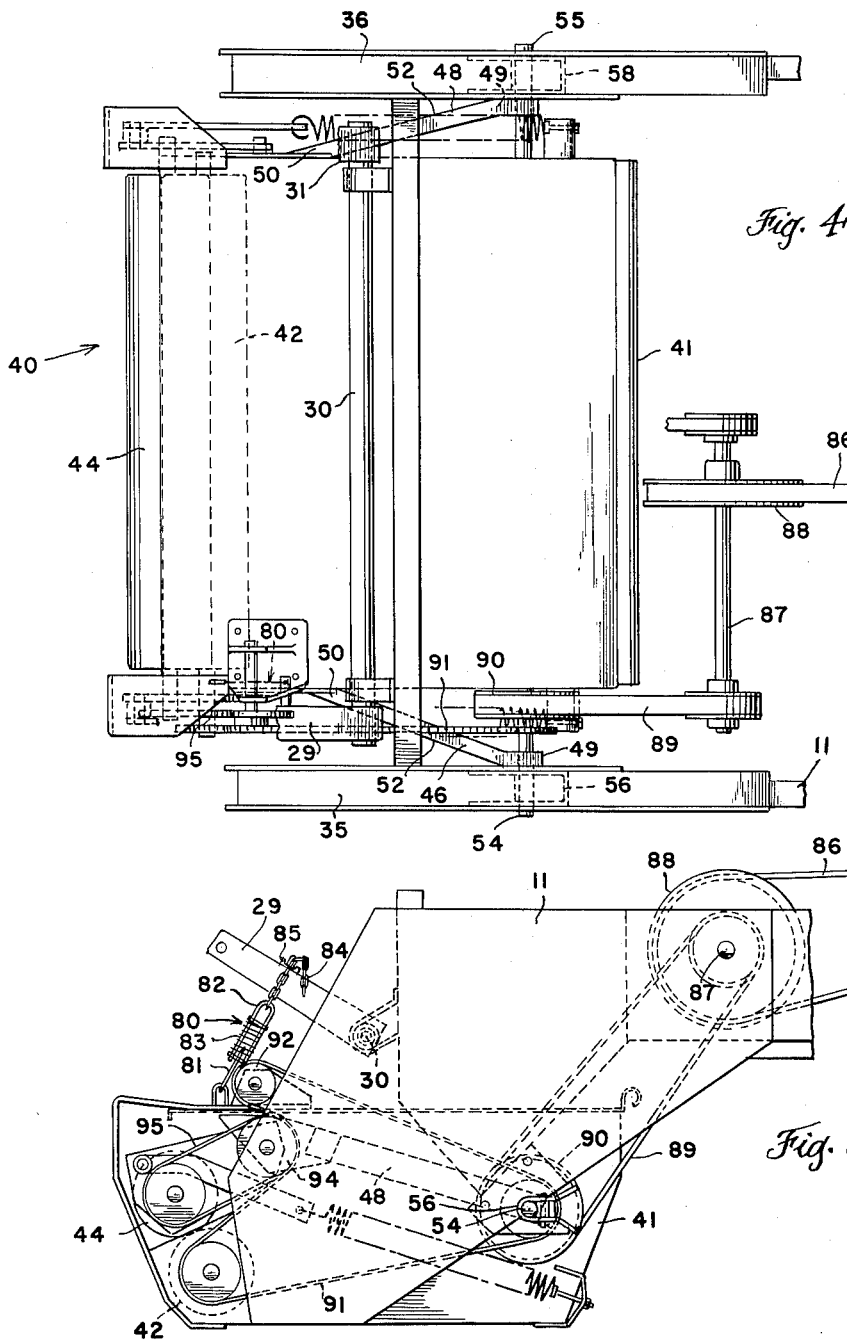
FIG. 4 is a plan view of the conditioner.
FIG. 5 is a side elevation of the conditioner, pivoted from the position shown in FIG. 1 to a generally horizontal location.

Referring now to the drawings by numerals of reference, and particularly to FIG. 1, 10 denotes a windrower having a frame 11 supported on a pair of coaxial laterally spaced ground wheels, one of which is shown at 12, and a rearwardly located caster wheel 14. An engine 15 is mounted on frame 11 and connected by a power train including chain means 16 to drive the ground wheels and move frame 11 in a forward direction as indicated by the arrow 18.

The forward end of frame 11 carries a header unit part of which is shown at 19 and supported on springs 20 from a rocker arm 21 pivotally connected to the frame. A lift arm 22 is pivotally connected at 24 on frame 11 and extends forwardly for pivotal connection at 25 to a link 26 pivotally connected at 28 to a support arm 29. As shown best in FIG. 4, support arm 29 is fixed to a bar 30 which extends transversely and has a support arm 31 at its opposite end similar to arm 29. The arms 29 and 31 extend generally in parallel relation to the lift arm 22. As shown in FIG. 1, a hydraulic cylinder 32 is connected between frame 11 and lift arm 22 and having a piston rod 34 which when extended causes the lift arm 22 to swing upwardly. Such movement of the lift arm is transmitted through link 26 to the support arm 29 to pivot it upwardly. The opposite side of the machine has a lift arm not shown similar to arm 22 and connected to arm 31.

Frame 11 of the windrower has side channels 35 and 36 between which a crop conditioner 40 is located and detachably mounted in underslung relation to the frame by the mounting structure of this invention. The conditioner comprises a frame structure 41 which rotatably supports a pair of cooperative conditioning rolls 42 and 44. These rolls are located across the front of frame 41 and they extend transversely relative to the travel of the machine. The axis of rotation of upper roll 44 is slightly forwardly of the axis of rotation of lower roll 42.

Frame 41 of the conditioner includes side bars 46 and 48 at opposite sides respectively of the conditioner and extending diagonally inwardly from rearward ends 49 to forward ends 50. These guide bars provide diagonal walls 52 engageable with the frame 11 of the windower to laterally orient the conditioner for mounting.

Adjacent the rearward end of conditioner 40, the frame structure 41 has coaxial shaft sections 54 and 55 extending traversely and outwardly of opposite sides respectively of the conditioner frame. A clevis saddle bracket 56 is provided on the section 35 of frame 11 and the opposite frame member 36 has a similar clevis saddle bracket 58. Both saddle brackets are the same. Therefore, the details of the design of only bracket 56 will be described, it being understood that bracket 58 is similarly constructed.

As shown best in FIGS. 2 and 3, bracket 56 has legs 60 and 61 which are vertically spaced relative to each other and connected by a forwardly located bight portion 62. At their rearward ends, the legs diverge from each other to provide cam surfaces 64 and 65 to guide shaft section 54 into the bracket. The shaft section 54 is surrounded by a spacer sleeve 66 and both the shaft and spacer are held within bracket 56 by a block 68. Block 68 has a concave face 69 which is concentric to shaft 54 and abuts against the periphery of spacer sleeve 66. A groove 70 is formed in the block which communicates with a passage 71 from concave face 69 to the outside face 72 of the block. A grease fitting 74 is provided whereby lubricant may be forced through passage 71 and to groove 70 to lubricate the periphery of the spacer sleeve and thus facilitate the rotability of shaft 54 in bracket 56. The block 68 is locked in place by a vertically extending latch pin 75 having an enlarged head 76 engageable with upper leg 60 and a shank 78 which extends through block 68 and through legs 60 and 61.

The shafts 54 and 55, being rotatably supported on the saddle brackets, provide a transverse pivot axis about which the conditioner is swingable and adjustable. Such adjustment is provided by means of a pair of telescopic links one of which is shown at 80. The other link is at the opposite side of the machine. The telescopic link at one side of the header is interconnected between conditioner frame 41 and support arm 29 while the opposite link is connected between frame 41 and support arm 31. Link 80 includes a lower telescopic member 81 and an upper telescopic member 82 interconnected by a spring 83. Member 81 is permanently attached to frame 41. Member 82 is detachably connected by a chain 84 to a bracket 85 on support arm 29. The chain 84 provides a flexible adjustable link connection to support arm 29 whereby upon pivoting movement of the support arm by lift arm 22 the conditioner front end may be raised and lowered.

For driving rolls 42 and 44, an endless belt 86 drives from engine 15 a pulley 88 connected by shaft 87 and belt 89 to a drive sheave 90 pivotally supported on the conditioner frame 41 and coaxial to the axes of shaft sections 54 and 55. An endless belt 91 connects pulley 90 to lower roll 42. Belt 91 extends around a tightener roll 92. A back wrap connection is provided to an idler pulley 94 connected by a belt 95 to upper roll 44. With this arrangement, when the pulley 90 is rotated in a clockwise direction when viewed as shown in FIG. 5, lower roll 42 rotates in a same direction while the belt 95 rotates the upper roll 44 in a counterclockwise direction. Because the pulley 90 is coaxial with shafts 54 and 55, adjustment up or down of the conditioner forward end relative to windrower frame 11 does not disturb the drive to the conditioner rolls.

When the conditioner 40 is not in use and disconnected from windrower 10, the front of the conditioner is placed on the ground and its rearward end is supported by wood blocks, not shown. Blocks are used which maintain shaft sections 54 and 55 at an elevation similar to the elevation of the saddle brackets 56 and 58 on the windrower frame 11.

To mount the conditioner on the windrower, the operator backs the windrower frame over the unit. The frame is aligned as much as possible to have the conditioner midway between frame channels 35 and 36. If the alignment is not correct, the engagement of the windrower frame with the diagonal guides 46 and 48 will laterally orient the conditioner with the frame. When the shaft sections 54 and 55 come into engagement wtih the saddle brackets 56 and 58, the cam surfaces 64 and 65 will vertically orient the conditioner and the shaft sections will slide into the brackets. When seated therein, the bracket blocks 68 are inserted and locked in place by pins 75 to prevent outward movement of the shaft sections relative to the brackets. Thus, the rearward end of conditioner 40 is detachably connected to the windrower frame and the ground support blocks may be removed by kicking them free or by backing the windrower until the blocks fall.

To attach the front end 44 of conditioner 40 to frame 11, the operator connects the ends of chains 84 to lift levers 29 and 31. Then through hydraulic cylinder means 32, the lift arms are pivoted upwardly. This raises the front 44 of the conditioner through lift links 80, the rearward end 41 merely pivoting in saddle brackets 56 and 58. Then woodblocks are placed under the conditioner front end and the lift levers are swung downwardly to slack chains 84. The ends of chains 84 are disconnected from the lift levers and intermediate links of the chains are connected to brackets 85. When the lift levers are again elevated, the wood support blocks may be removed, whereupon the conditioner is supported solely by windrower frame 11.

To disconnect conditioner 40 from frame 11, the procedure just described is repeated, but in reverse order. It is thus seen, that whether the conditioner is being mounted or disconnected, the lift system of the windrower is utilized to perform the operation. When mounted in underslung relation to frame 11, the conditioner is freely pivotally adjustable relative to the frame. The fittings 75 provide readily accessible means whereby the shafts 54 and 55 may be kept lubricated for free pivoting in the brackets 56 and 58. The conditioner is pivotally supported at its rearward end and detachably flexibly supported at its forward end. No bolts or other fixed fasteners are employed or required in the mounting. An operator can quickly and easily achieve a mounting or dismounting of the conditioner on frame 11 and without strenuous effort.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. An agricultural machine comprising a frame supported on wheels for ground travel, a crop conditioner detachably and pivotally carried in underslung relation to said frame, said conditioner having a forward end and a rearward end, a pair of cooperative transverse rolls rotatably carried on said conditioner forward end, drive means for rotating said rolls, a pair of coaxial transverse shaft sections affixed to said conditioner rear end and extending laterally outwardly thereof, one on one side of the conditioner and the other at the opposite side, a pair of clevis saddle brackets affixed to said frame and in which said shaft sections pivotally seat, each of said brackets being substantially equally spaced from said conditioner so that the conditioner is centered therebetween, each bracket having vertically spaced legs extending in a horizontal direction and connected by a forwardly located vertical bight, fastening means on said brackets detachably locking the shaft sections against rearward movement out of the brackets, a lift lever on said frame above said conditioner forward end and pivotal in a vertical direction, means for pivoting said lift lever, and hanger means detachably connecting said lift lever to said conditioner forward end to pivot the conditioner about said shaft sections in response to pivoting of the lift lever whereby the conditioner forward end may be raised and lowered.

2. An agricultural machine as recited in claim 1 wherein the rearward ends of said legs of said saddle brackets diverge and provide vertically spaced inclined cam surfaces to facilitate sliding said shaft sections into the saddle brackets and vertically orient the rearward end of the conditioner to said frame.

3. An agricultural machine as recited in claim 1 wherein said conditioner has a pair of laterally projecting side guide bars, one on each side of the conditioner, said bars having rearward ends adjacent said shaft sections and then extending forwardly and inwardly therefrom to provide diagonal walls engageable with said wheeled frame to horizontally orient the conditioner relative to the frame.

4. An agricultural machine as recited in claim 1 wherein said fastening means comprises a pair of clevis blocks, one for each bracket and located between the legs thereof, each block having a concave side concentric to its associated shaft section and located adjacent to it, and a vertically extending latch pin projecting through each block and at least one leg of its associated bracket.

5. An agricultural machine as recited in claim 4 wherein each clevis block has a passage extending from its concave side to the opposite side of the block and through which lubricant may be passed to the adjacent shaft section, and said concave side having a groove to receive the lubricant.

6. An agricultural machine as recited in claim 4 wherein said latch pin for each block has an enlarged head at an upper end engaging the upper leg of its associated bracket and having a shank projecting downwardly through said upper leg, then through the block and then through the lower leg.

7. An agricultural machine as recited in claim 1 wherein a pair of laterally spaced lift levers are provided and said hanger means comprising a pair of hangers one along each side of the conditioner, each hanger having a pair of telescopic members, one connected to the conditioner forward end and the other connected to one of said lift levers, and spring means interconnecting said telescopic members and resisting extension thereof.

8. An agricultural machine as recited in claim 7 wherein a flexible element detachably connects said other telescopic member of each hanger to its lift lever.

9. An agricultural machine as recited in claim 8 wherein said flexible element of each hanger comprises a chain, the links of which are selectively engageable with a bracket on its associated lift lever.

10. An agricultural machine as recited in claim 1 wherein said drive means for rotating said conditioner rolls comprises a motor on said frame, a drive wheel on said conditioner, means connecting said motor to said drive wheel, and means connecting said wheel to said conditioner rolls, said drive wheel being on the same axis as said shaft sections.

11. An agricultural machine comprising a frame supported on a pair of laterally spaced wheels for ground travel in a fore-and-aft direction, a conditioner detachably and pivotally carried in underslung relation to said frame, said conditioner having a forward end and a rearward end, a pair of cooperative transverse rolls carried on said conditioner forward end, a pair of laterally projecting side bars, one on each side of the conditioner, said bars having diagonally extending walls diverging rearwardly and engageable with said frame to horizontally orient the conditioner relative to the frame, a pair of coaxial transverse shaft sections affixed to said conditioner rear end and extending laterally outwardly thereof, one on one side of the conditioner and the other at the opposite side, a pair of clevis saddle brackets affixed to said frame and in which said shaft sections pivotally seat, each bracket having vertically spaced legs extending in a horizontal direction and connected by a forwardly located vertical bight, the rearward ends of the legs of each bracket diverging and providing inclined cam surfaces to facilitate sliding said shaft sections into the brackets to thereby vertically orient the rearward end of the conditioner relative to said frame, a clevis block for each bracket and located between the legs thereof, a pin extending vertically through each block and detachably connecting it to its associated bracket, each block and pin detachably locking its shaft section against rearward movement out of its bracket but allowing pivotal movement within the bracket, a pair of lift levers on said frame above the conditioner forward end and pivotal in a vertical direction, a pair of resilient, flexible hangers connecting said lift levers to said conditioner forward end, means for pivoting said lift levers to raise and lower the forward end of the conditioner through said hangers and pivot the conditioner about the shaft sections, a drive motor on said frame, a drive wheel on said conditioner adjacent one of said shaft sections and coaxial therewith, means connecting said drive wheel to said conditioner rolls, and means connecting said motor to said drive wheel.

References Cited by the Examiner

UNITED STATES PATENTS

| | | | |
|---|---|---|---|
| 2,554,198 | 5/1951 | Kuhlman | 56 |
| 2,732,784 | 1/1956 | Tanke et al. | 172—272 |
| 2,989,829 | 6/1961 | Heth et al. | 56—1 |

ABRAHAM G. STONE, *Primary Examiner.*

ANTONIO F. GUIDA, *Examiner.*